United States Patent [19]
Thurman

[11] Patent Number: 5,297,580
[45] Date of Patent: Mar. 29, 1994

[54] HIGH PRESSURE BALL AND SEAT VALVE WITH SOFT SEAL

[76] Inventor: Bobbie Thurman, P.O. Box 69714, Odessa, Tex. 79769

[21] Appl. No.: 12,639

[22] Filed: Feb. 3, 1993

[51] Int. Cl.⁵ .............................................. F16K 15/04
[52] U.S. Cl. .................. 137/533.15; 251/361; 251/364; 251/368
[58] Field of Search ............... 137/533.11, 533.13, 137/533.15; 251/361, 364, 368

[56] References Cited
U.S. PATENT DOCUMENTS

| | | | |
|---|---|---|---|
| 3,661,167 | 5/1972 | Hussey | 137/533.15 X |
| 4,086,936 | 5/1978 | Vork | 137/533.11 |
| 4,128,110 | 12/1978 | Hayatayan | 251/361 X |
| 4,243,067 | 1/1981 | Rubey | 251/368 X |
| 4,662,392 | 5/1987 | Vadasz | 251/368 X |

Primary Examiner—Robert G. Nilson

[57] ABSTRACT

A valve seat for a ball valve of a positive displacement pump for producing fluid from a subsurface formation wherein the valve seat is provided by a valve assembly having a non-corrosive hollow metallic housing therein which may have an internal radial groove therein, the metallic housing having an elastomeric material forming a bonded insert which has an aperture therethrough and a chamfered face for seating the ball of the ball valve in sealing engagement with said bonded insert.

12 Claims, 1 Drawing Sheet

U.S. Patent    Mar. 29, 1994    5,297,580
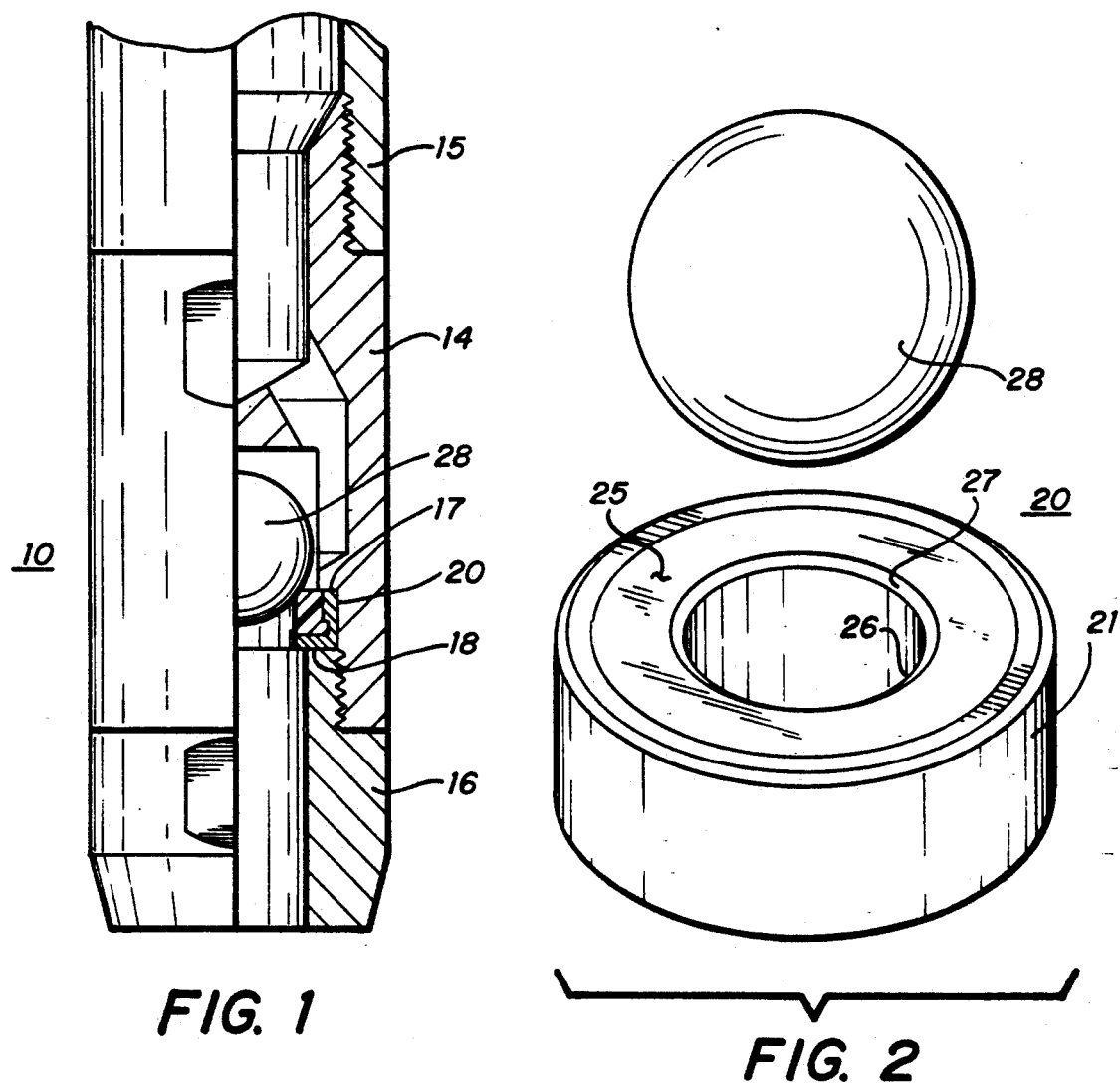
FIG. 1
FIG. 2
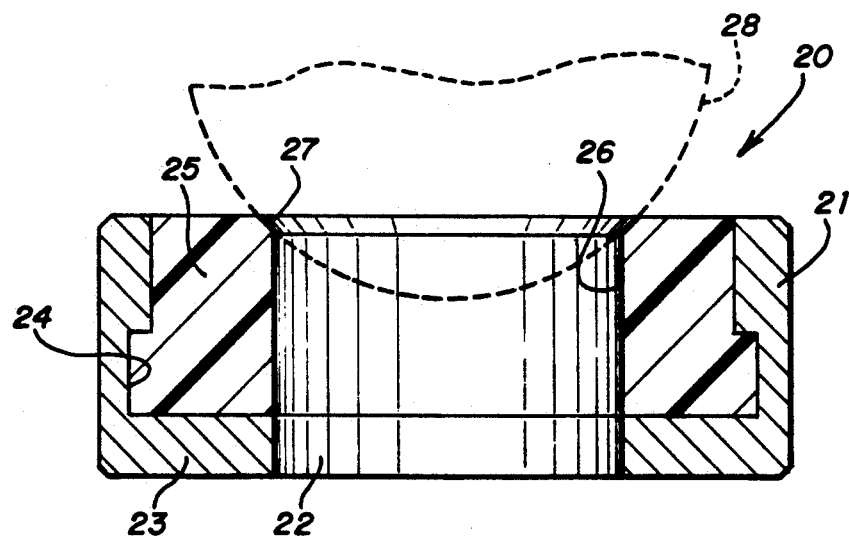
FIG. 3

HIGH PRESSURE BALL AND SEAT VALVE WITH SOFT SEAL

BACKGROUND OF THE INVENTION

The present invention relates to an improvement in check valves, and more particularly a check valve used in positive displacement subsurface pumps in an oil production string, and more specifically to the valve seat thereof.

High pressure ball and seat type valves are commonly used in fluid transfer applications utilizing a metal-to-metal seat. Various fluid characteristics directly affect mechanical efficiency of this type seal. Given the nature of this type seal, premature failure often occurs, intermittent or continuous. Intermittent failure is often caused by suspended solids in fluid and/or entrained gases. Solids that become trapped between ball and seat prevent complete seal, and in high pressure applications cause pressure drop and extreme cavitation across face of the seat. Repeated intermittent failure will result in permanent seat damage and continuous valve failure. Although valve may not experience significant loss of mechanical efficiency with minute damage, the condition is irreversible and progressive. Given the nature of this type valve and application, pressure drop naturally occurs at the seating area. Entrained gases tend to break out as a result. Noncompressible fluid transfers smoothly while compressible fluid does not. Compressible fluid at high pressure transfers violently, causing impingement of the seating surfaces. This reaction is detrimental to valve efficiency and cycle life.

Another type affliction associated with metal-to-metal intermittent seating is electrolysis. Whereas fluid and metal are adequate conductors of electricity, the opposing seal surfaces act as electrodes discharging minute electrochemical energy between them. This discharging creates a failure similar in appearance and effect to that of cavitation and/or corrosion.

To overcome these problems various check valve arrangements have been suggested. U.S. Pat. No. 4,781,213 issued to Kilayko describes a ball check valve primarily designed using an O-ring seat wherein the O-ring has an ID less than the diameter of the ball and an OD greater than the diameter of the aperture. Kilayko disclose a ball check valve body comprising a base and a housing securable together. The assembly comprises a subassembly providing a first surface; an assembly fluid conduit terminates at the first surface in a port of circular cross section for communication with a base fluid conduit in the base. Within the assembly fluid conduit, an O-ring seat is aligned with the port; an elastomeric O-ring is positioned in the seat. Spacer means, radially outward of the O-ring seat, extends generally away from the first surface and has a dimension adjacent the O-ring seat greater than the cross sectional diameter of the O-ring when unstressed. Such an arrangement may be suitable for a chemical pump, but would be somewhat unworkable in a subsurface pump.

U.S. Pat. No 4,086,936 to Vork describes a one-way check valve for use in a reciprocating pump. The invention overcomes some of the disadvantages of the prior art by including resilient seat member having a noncomplimentary shape to the spherical ball, and further having a deformable conical shape to provide variable pressure equalization. The valve employs a metallic ball sized in relation to the conical seat surface for providing limited deformation of the seat under pressure. He describes a typical Urethra material for the conical seat with a compressive strength of 20,000 pounds per square inch (p.s.i.) and a compressive modulus of $0.04-0.90 \times 10^5$ p.s.i. To take advantage of this invention, the existing downhole pumps would have to be modified substantially including removing from the production string and replacing the downhole pump completely or at least the ball valve.

U.S. Pat. No. 5,062,450 to Bailey discloses the use of elastomers to reduce the weight of the valve body.

U.S. Pat. No. 2,695,628 to Wheildon describes a check valve with the ball being made of alumina and the seat of carbon boride or mixtures with metal borides. The function of the valve is to provided a check valve which is highly resistant to corrosion and abrasion such as is encountered in oil well pumps.

U.S. Pat. No. 4,662,392 to Vadasz describes a check valve for subsurface positive displacement pumps used for pumping crude oil with a high degree of solids. The ball check valve comprises a valve seat and a valve ball wherein the valve seat is comprised of a hollow cylindrical body defining an orifice through which fluid passes wherein the hollow cylindrical body is provided with an insert at the orifice of the hollow cylindrical body which forms the valve seat. The insert is formed of a material having a hardness greater than the hardness of the material from which the valve ball is formed which material in turn is characterized by a high resiliency. It is preferred that the ball of the valve be formed of a material having a high resiliency and a modulus of elasticity of between $0.1 \times 10^6$ p s i. to $15 \times 10^6$ p.s.i. and a surface hardness of 600–1200 on the Vickers scale. The inventor prefers carbon base materials for the valve ball including carbon base materials such as polymeric materials sold under the mark TORLON and manufactured by Amoco. The insert according to Vadasz is formed of a material having a hardness greater than 1300 on the Vickers scale. Vadasz suggests suitable materials for the insert include ceramic materials or sintered materials, including carbide. Utilizing Vadasz' invention again would require removing existing subsurface pumps and replacing the valves or the entire pump.

As a result of the relative differences in hardness of the various parts of the ball check valve as set forth above, the cylindrical body which is formed of the softest material dissipates a substantial part of the force generated by the impact of the valve ball on the hard insert.

SUMMARY OF THE INVENTION

The present invention overcomes the disadvantage in the prior art of existing subsurface pumps with ball valves therein by providing a simple replacement valve seat which consists of a urethanene ring bonded to a noncorrosive housing such as stainless steel. Replacing the existing seats in subsurface pumps is quite simple and can be done at a time when the pump has been pulled for maintenance. Particularly, the soft seal seat is adapted to receive a ceramic or steel ball. Thus, suspended solids under the operating conditions of the valve do not cause substantial damage to the seat or the ball. The soft seat of this invention reduces cavitation damage due to the cushioning effect provided by the elastomer. The problem of electrolysis is eliminated with the seating material.

The valve seat of applicant's invention is composed of a noncorrosive cylindrical housing with a urethanene insert bonded thereto. The insert has a Shore "D" hardness between 60-80, and preferably 65-75, with a typical hardness of 74 on the Shore "D" hardness scale. The urethane with the hardness chosen is resistant to abrasion, has a high load bearing capacity, is highly resistant to impact, is flexible, is resilient and resistant to thermal shock. It is also resistant to such things as ozone and oxygen. The urethane being an excellent insulating material avoids the problem of electrolysis with the ball.

Accordingly, it is an object of this invention to provide an improved valve seat for an intermittent opening and closing valve, having increased fluid transfer efficiency, and reduced seating failure.

It is another object of this invention to provide an improved valve seat which consists of a noncorrosive body with a urethane insert bonded thereto.

It is another object of the invention to provide an improved valve seat of a urethane material having a Shore "D" hardness between 60 and 80 which is bonded to a housing which is designed to seat in a standard valve cage.

Further objects and advantages will appear from the following description of the preferred embodiment together with the drawings, in which:

BRIEF DESCRIPTION OF THE DRAWINGS

FIG. 1 is a partial sectional view of a standard valve cage and valve seat plug in partial cross-section.

FIG. 2 is a perspective view of the valve seat with a ball separated therefrom.

FIG. 3 is a cross-sectional view of the valve seat with a phantom ball illustrated in dotted lines seated thereon.

DETAILED DESCRIPTION OF THE INVENTION

Referring now to the drawings, and in particular to FIG. 1, a standing valve, generally referred to as 10, is secured by threads to the bottom of pump barrel 15 of a downhole pump not fully shown. The standing valve 10 has a cage 14 and a seating plug 16 which is disclosed as threaded into cage 14 at the lower end thereof. Cage 14 has a shoulder 17 and plug 16 has an end face 18. Valve seat 20 of applicant's invention is seated between shoulder 17 of cage 14 and end face 18 of seating plug 16 which secures valve seat 20 in place. Referring now additionally to FIG. 2 and FIG. 3, valve seat 20 consists of an outer housing 21 of a non-corrosive material, such as stainless steel, having a bore 22 forming a fluid passage in base 23 of housing 21. Further housing 21 near the base 23 thereof has a radial channel 24. Bonded to the housing 21 is an elastomeric material 25 with aperture 26 which forms a chamfered seating surface 27 for seating ball 28 in a fluid tight manner. The elastomeric material is typically urethane having a Shore "D" hardness of between 65 and 75.

In a typical installation of valve seat 20, when the pump has been pulled for repair or maintenance, the seating plug 16 would be unthreaded from cage 14 and the old valve seat removed, the ball examined to see if it had any damage and, if so, would be replace with a new ball and then valve seat 20 of the invention would be inserted in cage 14 and seating plug 16 threaded in the cage 14 to secure valve seat 20 therein with a new ball if necessary. Thus, it will be seen that valve seat 20 can be readily inserted in existing valve cages and held in place by existing seating plugs.

A typical 70-D (Shore) durometer polyurethane suitable for the novel seat exhibited the following physical properties upon testing as described in the table.

| MATERIAL SPECIFICATION TABLE 70-D DUROMETER POLYURETHANE | |
|---|---|
| Physical Properties | |
| Hardness, Shore D (P&J*) | 74 (3) |
| 100% Modulus, psi (MPa) | 5000 (34.5) |
| Tensile, psi (MPa) | 7120 (49.1) |
| Elongation, % | 230 |
| Split Tear, D-470, pli (kN/m) | 117 (20.5) |
| Compression Set, ASTM Method B, 22 Hrs. @ 158° F. (70° C.) (too hard to test) | |
| Bell Brittle Point, °F. (°C.) | −64.5 (−54) |
| Bashore Resilience, % | 47 |
| Impact Strength, Notched Izod ft. lb./in. (Joules/m) | 18-19 (954-10) |
| Specific Gravity | 1.21 |

*Posey & Jones Hardness

It will be appreciated that the seat of the present invention may be of suitable diameter and chamfer consistent with the size of the valve cage and captured ball. Further, other configurations of the bonding (or mating) surfaces of the seat is well within the scope of the present invention.

What is claimed is:

1. In an oil well down-hole pump having a ball valve therein for producing fluid therefrom, the improvement comprising:
    a ball valve seat having a non-corrosive metal body conforming to API specifications for replacement of an existing valve seat in said down-hole pump, and having an insert bonded to said metal body forming the seating surface for the ball of said ball valve,
    said insert formed from a urethane plastic having a shore "D" hardness from between 60 to 80, elongation percent of at least 230, tensile strength of at least 7000 pounds per square inch, said insert contoured to seat and seal said ball against fluid flow.

2. The subsurface positive displacement pump of claim 1 wherein said hollow cylindrical body is stainless steel.

3. In an oil Well down-hole pump having a ball valve therein for producing fluid therefrom, the improvement comprising:
    a ball valve seat having a non-corrosive metal housing conforming to the internal diameter of the valve cage wherein the housing is seated, said housing further having an internal orifice with an internal radial channel in the internal periphery thereof, and including a central bore in the bottom of the housing,
    an elastomeric insert having a Shore "D" hardness of between 60-80 and a tensile strength of at least 7000 pounds per square inch bonded within said metal housing and in the orifice formed therein,
    said elastomeric insert having an aperture the same diameter as the central bore in said housing and having a face thereon adapted for sealingly seating a valve ball,
    said elastomer further having insulating characteristics sufficient to prevent electrolysis between said housing and said ball.

4. The down-hole pump of claim 3 wherein the elastotmeric insert has an elongation of at least 230 percent.

5. The down-hole pump of claim 4 wherein said metal housing is stainless steel.

6. The down-hole pump of claim 3 wherein the Shore "D" hardness is between 65 to 75.

7. In a subsurface positive displacement pump including a ball valve assembly used in the petroleum industry for pumping crudes characterized by a high degree of suspended particles, the improvement comprising:
   a ball valve assembly including:
   a metallic cylindrical housing having an orifice therethrough, having a counterbore greater than the orifice and having an internal radial channel at the bottom of said counterbore,
   an elastomeric material, having a hardness less than the hardness of the cylindrical housing and the valve ball, bonded to the surface of the counterbore and said radial channel within said cylindrical housing forming a bonded insert,
   said bonded insert having an aperture the diameter of the orifice and a chamfered surface on the bonded insert for seating the ball of the ball valve in sealing engagement with said bonded insert.

8. The positive displacement pump of claim 7 wherein said elastomeric material has a Shore "D" hardness between 60 to 80.

9. The positive displacement pump of claim 8 wherein said elastomeric material has a Shore "D" hardness between 60 to 75.

10. The positive displacement pump of claim 8 wherein said elastomeric material has a tensile strength of at least 7,000 pounds per square inch.

11. The positive displacement pump of claim 10 wherein said elastomeric material has an elongation of 230 percent.

12. The positive displacement pump of claim 7 wherein the metallic cylindrical housing is stainless steel.

* * * * *